(12) United States Patent
Youngs et al.

(10) Patent No.: US 6,926,332 B2
(45) Date of Patent: Aug. 9, 2005

(54) ARTICULATING STORAGE COMPARTMENT

(75) Inventors: John David Youngs, Southgate, MI (US); David J Dooley, Troy, MI (US); James Gregory, Harrison Township, MI (US); Dick George, Dearborn, MI (US); Bogdan Radu, Dearborn, MI (US); Mike P. Schoemann, Waterford, MI (US)

(73) Assignee: Lear Corporation, Southfield, MI (US)

( * ) Notice: Subject to any disclaimer, the term of this patent is extended or adjusted under 35 U.S.C. 154(b) by 19 days.

(21) Appl. No.: 10/707,549

(22) Filed: Dec. 20, 2003

(65) Prior Publication Data

US 2005/0134074 A1    Jun. 23, 2005

(51) Int. Cl.[7] ................................................ B60R 7/04
(52) U.S. Cl. ..................... 296/37.13; 224/277; 224/544
(58) Field of Search .......................... 296/37.12, 37.13, 296/146.7, 149; 224/277, 282, 543, 544

(56) References Cited

U.S. PATENT DOCUMENTS

| | | | | |
|---|---|---|---|---|
| 1,243,958 A | * | 10/1917 | McFarland | 296/37.15 |
| 1,556,353 A | * | 10/1925 | Roedding | 224/282 |
| 1,700,121 A | * | 1/1929 | De Boer | 312/308 |
| 2,202,277 A | * | 5/1940 | Visser | 180/90 |
| 2,254,861 A | * | 9/1941 | Visser | 131/234 |
| 2,270,914 A | * | 1/1942 | Williams | 221/46 |
| 4,239,277 A | * | 12/1980 | Oda | 296/37.12 |
| 4,925,072 A | * | 5/1990 | Masler et al. | 224/282 |
| 5,535,571 A | | 7/1996 | Nichols | 52/716.6 |
| 6,070,927 A | * | 6/2000 | Mieglitz et al. | 296/37.12 |
| 6,196,606 B1 | | 3/2001 | McGoldrick | 296/37.13 |
| 6,328,191 B1 | | 12/2001 | Conley et al. | 224/563 |
| 6,655,563 B2 | * | 12/2003 | Shimajiri | 224/282 |

* cited by examiner

Primary Examiner—Lori L. Coletta
(74) Attorney, Agent, or Firm—Bill C Panagos

(57) ABSTRACT

Disclosed is a low cost articulating map pocket or storage compartment that requires few manufacturing steps. The articulating map pocket provides for a closed locking detent feature and in one preferred embodiment a full open locking detent feature also.

11 Claims, 6 Drawing Sheets

ARTICULATING STORAGE COMPARTMENT

BACKGROUND OF INVENTION

1. Field of the Invention

The present invention generally relates to an articulated map pocket that is cost effective, and of simplified design. More particularly the present invention relates to an articulating map pocket bin type compartment mounted in a door trim panel using a minimum number of parts.

2. Description of the Related Art

Nearly since the dawn of the automobile, map pockets have been attached to an interior component of the vehicle and used to store objects such as tissues, paper, pencils, and of course, maps. Over the years, the map pocket has evolved and at times has incorporated a closure device made from elastic materials or metal components. Map pockets have also been molded into the interior door panels as open compartments for the storage of items such as those described above. However there remains a need for a cost effective map pocket or storage compartment that can be closed during non-use periods.

For example, U.S. Pat. No. 5,535,571 issued Jul. 16, 1996 to Nichols teaches an automotive interior trim panel having an integral map pocket with an edge molding molded into the trim panel.

U.S. Pat. No. 6,196,606 issued Mar. 6, 2001 to McGoldrick teaches another integral door panel map pocket. The map pocket having a plurality of apertures therein.

U.S. Pat. No. 6,328,191 issued Dec. 11, 2001 to Conley et al teaches a map pocket having a lower portion and an upper locking flap portion for use in an automotive interior.

DISCLOSURE OF THE INVENTION

The present invention provides advantages and alternatives over the prior art by providing a low cost articulating storage compartment requiring few manufacturing steps.

According to a further aspect of the present invention, there is disclosed an articulating map pocket or storage compartment that can be adapted for use with any typical door trim panel.

According to yet another aspect of the present invention there is provided an articulating storage compartment suitable for use in a door trim panel comprising: a storage bin having a front, a back, two sides, a closed bottom and an open top, adaptable to be mounted in an opening in a door trim panel; each of said two sides having located near the top of said storage bin a articulating track into which a guide boss located on said door trim panel is mounted; each of said two sides further having located near the bottom of said storage bin a rotational track into which a guide boss located on said door trim panel is mounted; thereby providing for the opening outward of said door trim panel and for closing inward of said door trim panel an articulating storage compartment.

According to a yet further aspect of the present invention there is provided an articulating storage compartment suitable for use in a door trim panel comprising: a storage bin having a front, a back, two sides, a closed bottom and an open top, adaptable to be mounted in an opening in a door trim panel; each of said two sides having located near the top of said storage bin a guide boss mounted within an articulating track located on said door trim panel, and a spring retaining clip located above said rotational boss; a biasing spring having two ends, one end mounted in said spring retaining clip and one end mounted in said rotational boss; each of said two sides further having located near the bottom of said storage bin a rotational boss mounted in a corresponding bore located on said door trim panel; thereby providing for the opening outward of said door trim panel and for closing inward of said door trim panel an articulating storage compartment.

The present invention thus advantageously provides a solution for the need for map pocket type storage compartments within a vehicle economically and functionally attractive to the consumer.

DETAILED DESCRIPTION

Figure 1:
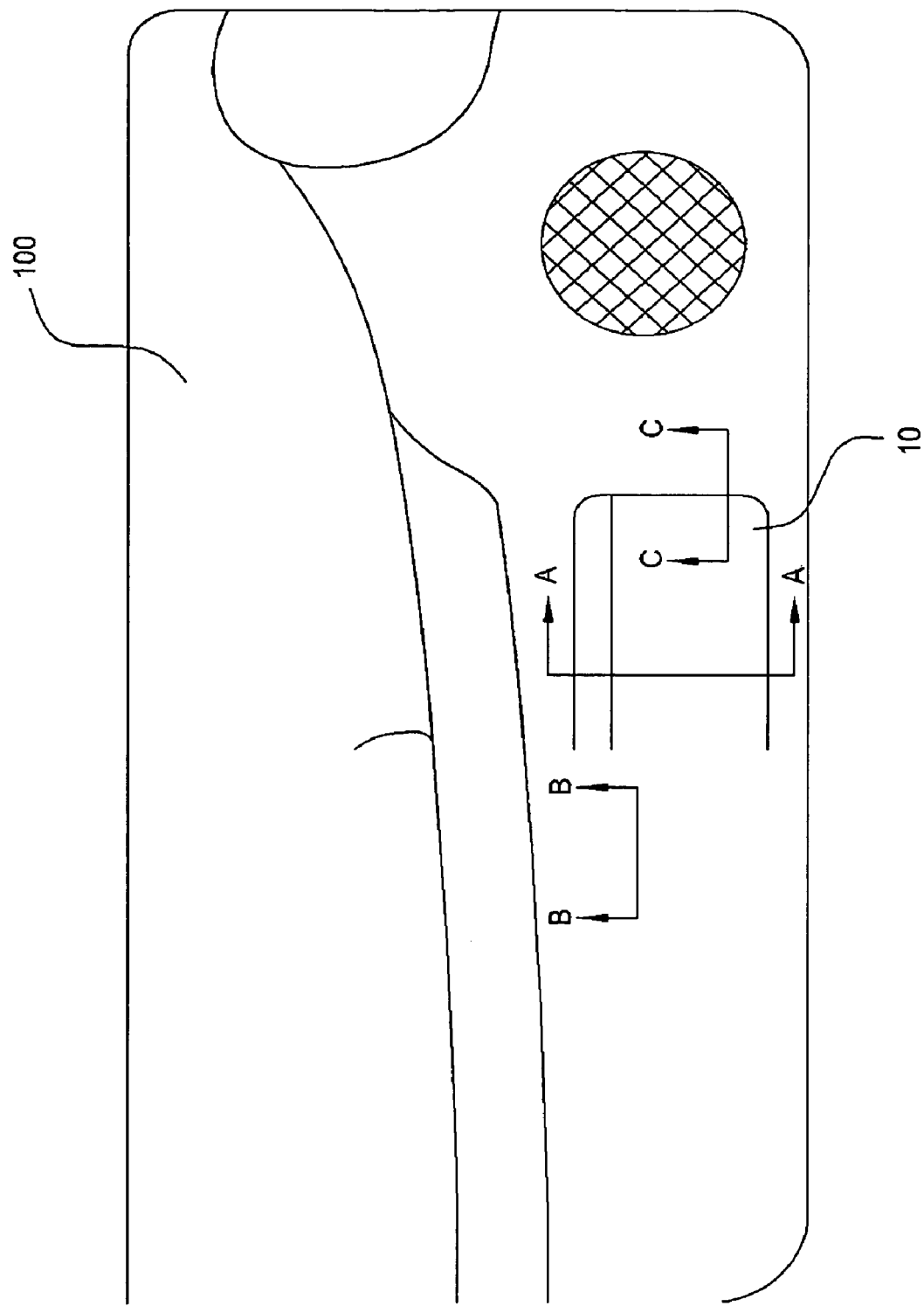
FIG. 1 shows a plan view of a typical vehicle door trim panel with the articulated compartment of the present invention in the closed or non-use position.

Reference will now be made to the drawings, wherein to the extent possible like reference numerals are utilized to designate like components throughout the various views. Referring to FIG. 1, which presents an articulating storage bin or map pocket 10 in a closed position mounted in a typical door trim panel 100.

Figure 2:
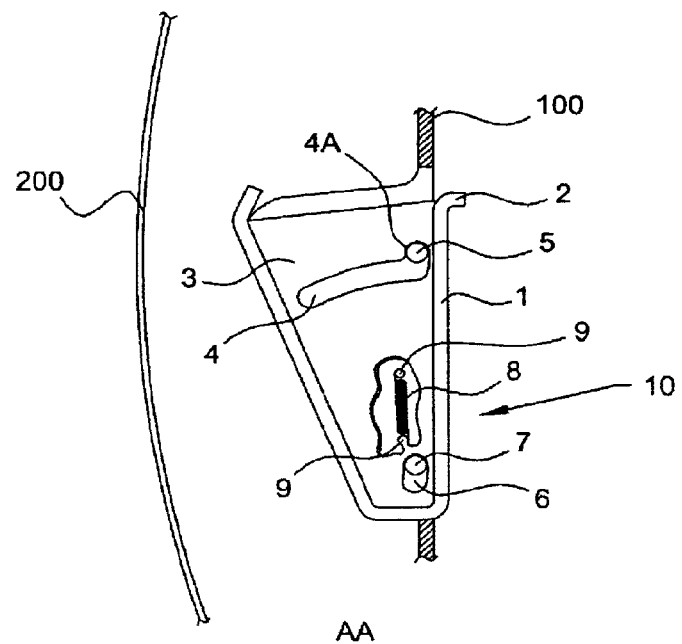
FIG. 2 shows a section plan view through line A A showing one preferred embodiment of the present invention in the closed or retracted position.

Referring now to FIGS. 2, 3, 4 and 5, there is shown a section plan view through line A A or FIG. 1 illustrating the opening of a preferred embodiment of the present invention. Particularly there is shown in FIG. 2 a vehicle exterior metal panel 200, a door trim panel 100 with the articulating storage compartment of the present invention 10 mounted in said door trim panel 100. Articulating storage compartment 10 comprises storage bin 1, with access lip 2, and having a pair of sidewalls 3. Sidewalls 3 have an articulation guide trough 4 molded therein into which locking boss 5 being part of door trim panel 100 guides the articulating movement of storage bin 1. Sidewalls 3 also have a rotational slot 6 molded therein into which locking boss 7 projects to allow the bottom of storage bin 1 to rotate during articulation. Also shown is optional spring 8 mounted on spring retaining pins 9, said spring 8 assisting in holding the storage bin 1 in the locked position. The front end of articulation guide trough 4 has a locking detent portion 4A to keep the storage bin 1 in a closed position until an occupant wishes to access the interior of the storage bin 1.

Figure 3:
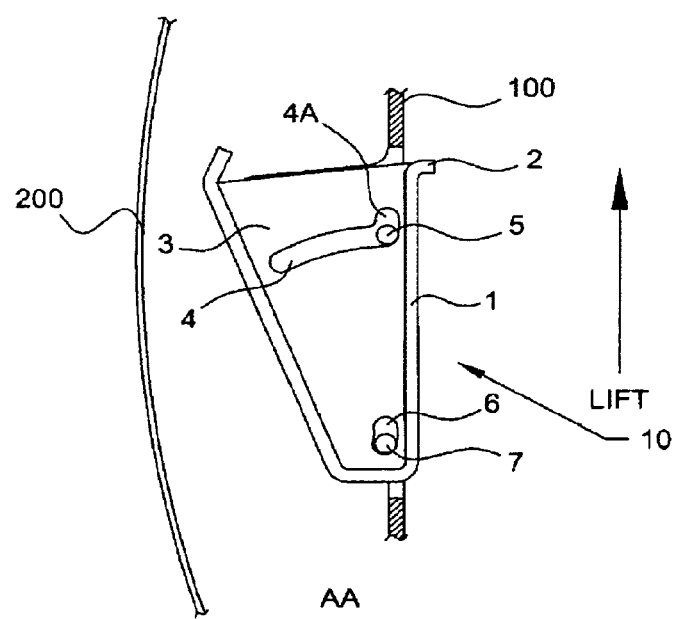
FIG. 3 shows a section plan view through line A A showing the retracted articulating compartment of FIG. 2 being lifted upward in preparation for opening.

FIG. 3 shows the same view as FIG. 2 where upward movement or lifting movement (see arrow) causes the storage bin 1 to be released from the locking position.

Figure 4:
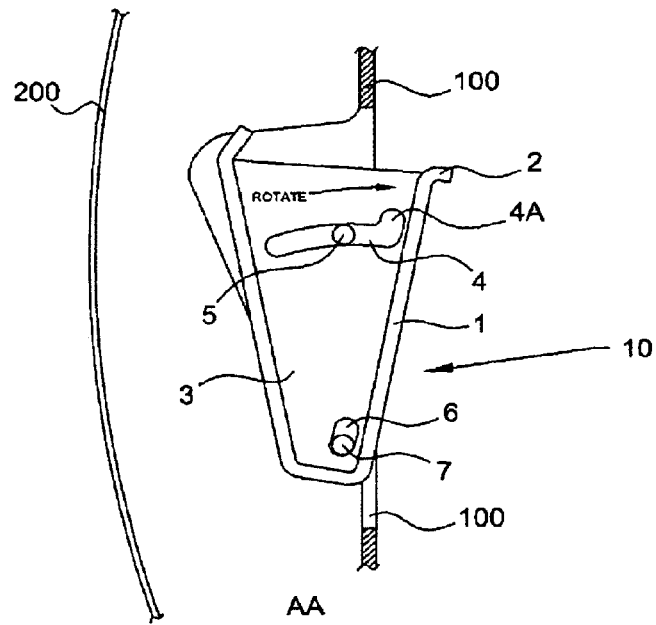
FIG. 4 show a section plan view through line A A showing the articulating compartment being opened into the interior of the vehicle compartment after completion of the upward movement illustrated in FIG. 3.

FIG. 4 shows the same view as FIG. 3 where movement outward (see arrow) causes the storage bin 1 to rotate on locking boss 7 and locking boss 5 traveling in articulation guide trough 4 to direct the opening movement of storage bin 1.

Figure 5:
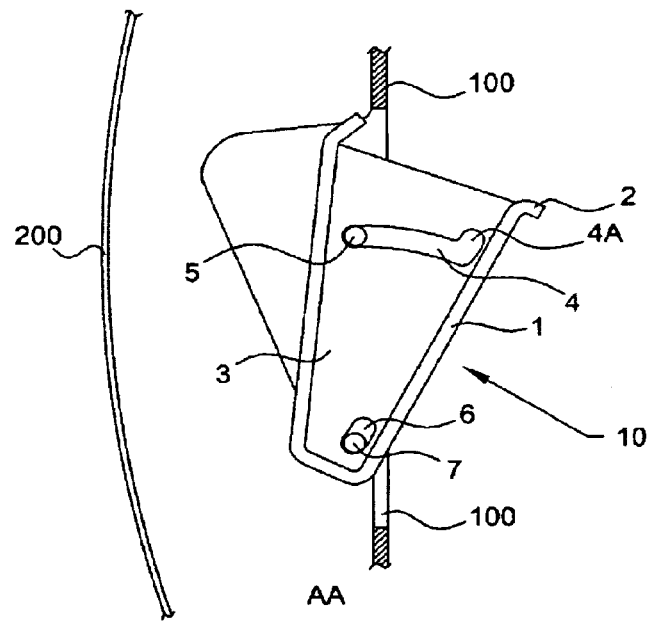
FIG. 5 shows a section plan view through line A A showing the fully opened articulating compartment of the present invention.

FIG. 5 shows the same view as FIG. 4 where the storage bin 1 has been opened to it fully open position determined by locking boss 5 coming to rest at the rear end of articulation guide trough 4.

Figure 6:
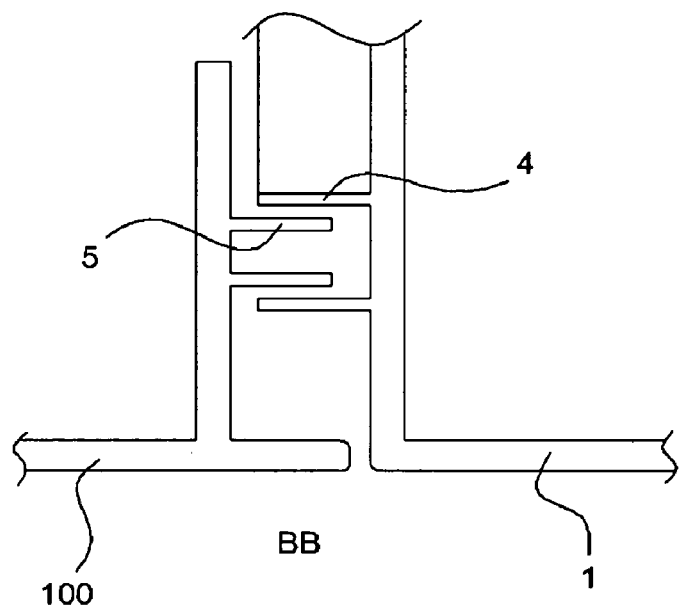
FIG. 6 shows a section plan view through line B B showing the upper articulating guide of a preferred embodiment of the articulating compartment of the present invention.

Turning now to FIG. 6, there is shown a section plan view of the locking boss 5 mounted within the articulation guide trough 4 and showing said articulation guide trough 4 as part of storage bin 1 and locking boss 5 as part of door trim panel 100.

Figure 7:
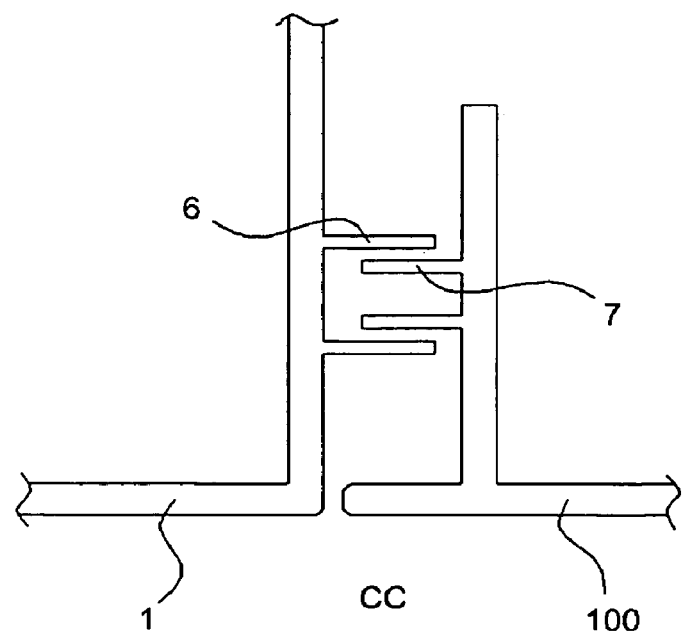
FIG. 7 shows a section plan view through line C C showing the rotation boss in the lower portion of a preferred embodiment of the articulating compartment of the present invention.

FIG. 7 shows a section plan view of the locking boss 7 as part of door trim panel 100 mounted in rotational slot 6 being part of storage bin 1.

One particularly preferred embodiment of the present invention provides for a map pocket or storage compartment 10 designed with two tracks or troughs 4 and 6 located on the sidewalls of a storage bin 1. These tracks or troughs 10 are used as guides for bosses 5 and 7 located on the door trim panel 100. When assembled together the articulating movement of the storage bin 1 is guided by the bosses 5 and 7 movement through the tracks or troughs 4 and 6. The articulation track or trough 4 includes a detention section 4A at the forward end of said track 4 designed to hold the storage bin 1 in the closed position until the storage bin 1 is lifted and pulled inboard using the access lip 2. This detent section 4A is designed such that the storage bin 1 cannot open with the force of the closing of the vehicle door. In an alternative embodiment a slight detent in the rear end of articulation track 4 holds the storage bin 1 in the fully open position. To prevent rattles and un-desired opening of the storage bin 1 springs 8 can be mounted on spring retaining pins 9 to hold the storage bin 1 down in the locked position of the tracks 4 and 6.

Figure 8:
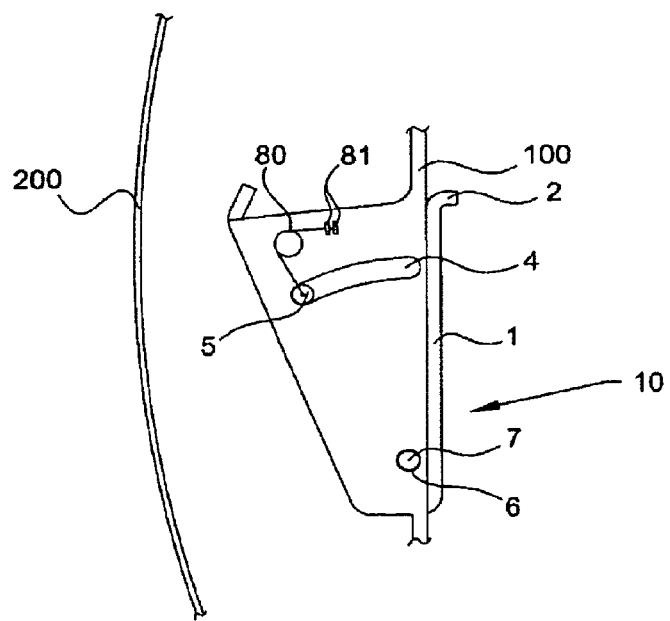
FIG. 8 shows a section plan view showing another embodiment of the present invention in the closed or retracted position.
Figure 9:
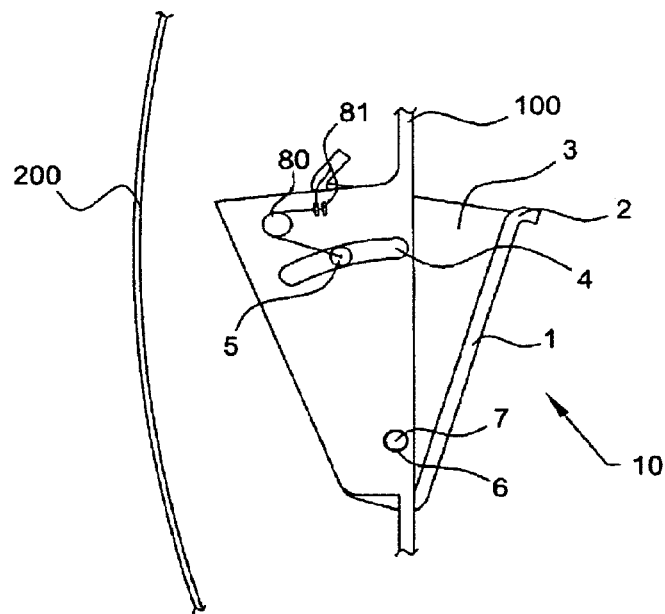
FIG. 9 shows a section plan view of the embodiment of FIG. 8 showing the articulating compartment being opened into the interior of the vehicle compartment.
Figure 10:
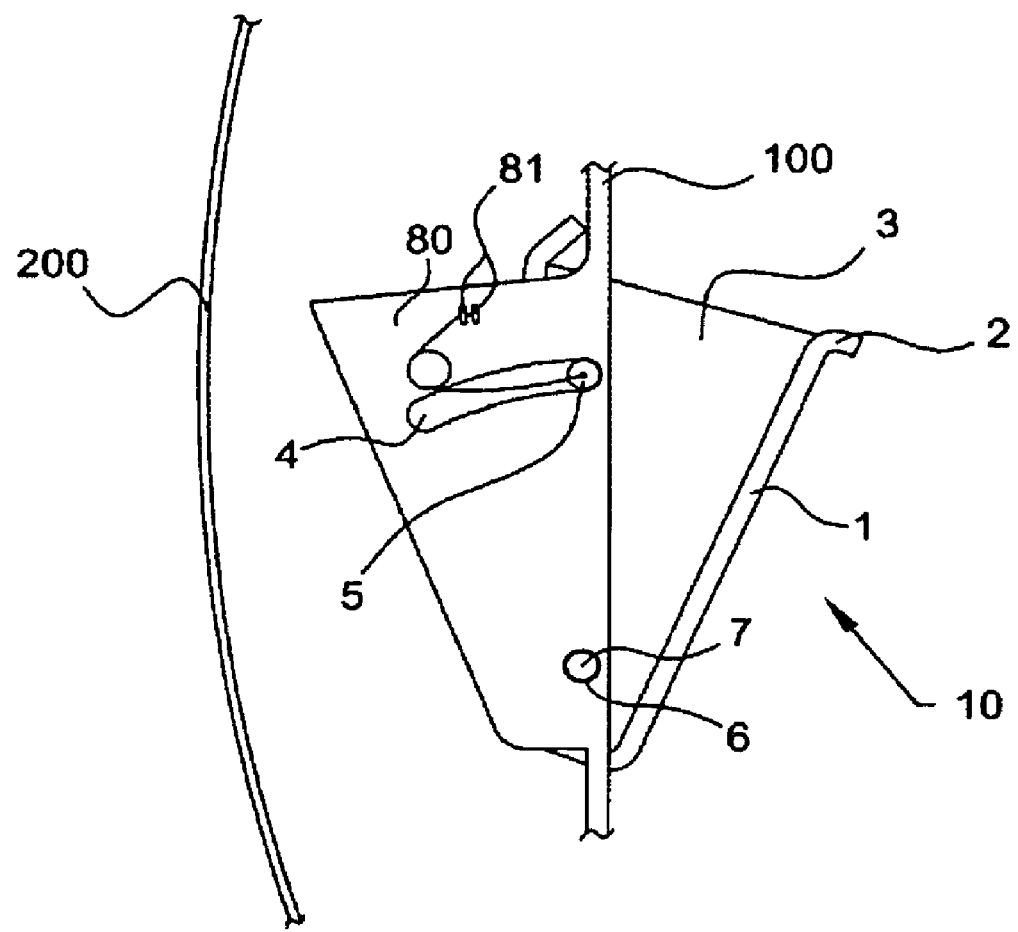
FIG. 10 shows a section plan view of the embodiment of FIG. 8 showing the articulating compartment in the fully opened position.

Referring now to FIGS. 8, 9 and 10, there is shown a section plan view illustrating the opening of another preferred embodiment of the present invention. Particularly there is shown in FIG. 8 a vehicle exterior metal panel 200, a door trim panel 100 with the articulating storage compartment of the present invention 10 mounted in said door trim panel 100. Articulating storage compartment 10 comprises storage bin 1, with access lip 2, and having a pair of sidewalls 3. Sidewalls 3 have a boss 5 molded therein into which articulation guide trough 4 being part of door trim panel 100 guides the articulating movement of storage bin 1. Sidewalls 3 also have a rotational bore 6 molded therein into which rotational boss 7 projects to allow the bottom of storage bin 1 to rotate during articulation. Also shown is spring 80 having one end mounted on spring retaining clip 81, and the other end of spring 80 being mounted in boss 5. Said spring 80 holds the storage bin 1 in the fully closed and fully open positions. The front end of articulation guide trough 4 has a locking detent portion 4A to keep the storage bin 1 in a closed position until an occupant wishes to access the interior of the storage bin 1.

FIG. 9 shows the same view as FIG. 8 where movement outward (see arrow) causes the storage bin 1 to rotate on rotational boss 7 and boss 5 traveling in articulation guide trough 4 molded into door trim panel 100 to direct the opening movement of storage bin 1.

FIG. 10 shows the same view as FIG. 9 where the storage bin 1 has been opened to it fully open position determined by boss 5 coming to rest at the rear end of articulation guide trough 4.

Currently preferred materials from which to make the present invention includes, for example, polypropylene, reinforced polypropylene, ABS, polycarbonate, polycarbonate/ABS, nylon, and polyacetal.

The currently preferred method of producing the present invention is plastic molding, most preferably injection molding.

Thus the present invention provides for a low cost articulating map pocket with a minimal number of components and manufacturing steps.

Although the preferred embodiments of the present invention has been disclosed, various changes and modifications may be made without departing from the scope of the invention as set forth in the appended claims.

What is claimed is:

1. An articulating storage compartment suitable for use in a door trim panel comprising:
   a storage bin having a front, a back, two sides, a closed bottom and an open top, adaptable to be mounted in an opening in a door trim panel;
   each of said two sides having located near the top of said storage bin an articulating track with a locking portion toward the front of said storage bin into which a guide boss located on said door trim panel is mounted;
   each of said two sides further having located near the bottom of said storage bin a rotational track providing for the pivoting and vertical movement to allow locking of said storage bin into which a guide boss located on said door trim panel is mounted;
   thereby providing for the opening outward of said door trim panel and for closing inward of said door trim panel an articulating storage compartment that is positioned in a locked position when fully closed within said door trim panel.

2. The articulating storage compartment as claimed in claim 1 wherein, said storage bin front has an access lip located on the outer surface thereof.

3. The articulating storage compartment as claimed in claim 1 wherein, said articulating storage compartment is composed of a plastic.

4. The articulating storage compartment as claimed in claim 3 wherein, said plastic is selected from the group consisting of polypropylene, reinforced polypropylene, ABS, polycarbonate, polycarbonate/ABS, nylon, and polyacetal.

5. The articulating storage compartment as claimed in claim 1 wherein, said articulating storage compartment is produced by molding, preferably injection molding.

6. The articulating storage compartment as claimed in claim 1 wherein, said articulating storage compartment has a spring on each side of said storage bin to prevent the storage compartment from opening during vehicle door closure.

7. An articulating storage compartment suitable for use in a door trim panel comprising:

a storage bin having a front, a back, two sides, a closed bottom and an open top, adaptable to be mounted in an opening in a door trim panel;

each of said two sides having located near the top of said storage bin a guide boss mounted within an articulating track located on said door trim panel, and a spring retaining clip located above said rotational boss;

a biasing spring having two ends, one end mounted in said spring retaining clip and one end mounted in said rotational boss;

each of said two sides further having located near the bottom of said storage bin a rotational boss mounted in a corresponding bore located on said door trim panel;

thereby providing for the opening outward of said door trim panel and for closing inward of said door trim panel an articulating storage compartment.

8. The articulating storage compartment as claimed in claim 7 wherein, said storage bin front has an access lip located on the outer surface thereof.

9. The articulating storage compartment as claimed in claim 7 wherein, said articulating storage compartment is composed of a plastic.

10. The articulating storage compartment as claimed in claim 9 wherein, said plastic is selected from the group consisting of polypropylene, reinforced polypropylene, ABS, polycarbonate, polycarbonate/ABS, nylon, and polyacetal.

11. The articulating storage compartment as claimed in claim 7 wherein said articulating storage compartment is produced by molding, preferably injection molding.

* * * * *